UNITED STATES PATENT OFFICE.

MOSES M. BAUMGARTNER, OF FREEPORT, ILLINOIS.

PROCESS FOR TREATING RICE AND PRODUCT THEREOF.

1,364,912. Specification of Letters Patent. Patented Jan. 11, 1921.

No Drawing. Application filed August 11, 1919. Serial No. 316,532.

*To all whom it may concern:*

Be it known that I, MOSES M. BAUMGARTNER, a citizen of the United States, residing at Freeport, in the county of Stephenson and State of Illinois, have invented certain new and useful Improvements in Processes for Treating Rice and Product Thereof, of which the following is a specification.

After the hull has been removed from natural rice it is called "brown rice" and after this brown rice has been polished to remove the germ and cuticle it is called "white rice" in the trade. It was customary for a long time to coat white rice with a solution of glue and talcum to preserve it, but this has been held to be adulteration under the pure food laws and now white rice, which has not been so treated, is being called "uncoated" rice in the trade.

Rice has always been a standard food product and for many years the public taste has demanded it in the polished form, regardless of the fact that in this form desirable food elements consisting of fats, proteids, mineral salts and vitamines have been removed. This rice has been marketed in bulk but the demand now exists that rice, like other products, be supplied to the trade in original package form.

The rice weevil is universally present in all raw rice. It may not appear to the naked eye when the rice is milled or even when it is distributed by a jobber, but it will appear sooner or later in the possession of the retailer or when kept on hand in the household for domestic use.

The object of my invention is, therefore, to treat uncoated rice, brown or white, by a simple and effective process to completely destroy all forms of animal organisms and so prepare the rice that it will keep in all climates and in all ordinary temperatures and can be packed in original packages for sale to consumers at any time and in any place without danger of damage by the presence of animal organisms.

In carrying out my process I first take a quantity of uncoated rice, brown or white, and wet it thoroughly. I then put this wet rice in a closed receptacle and admit wet steam to the receptacle for a period ranging from fifteen to sixty minutes until the rice is entirely free from all forms of animal organisms. The rice is then dried to twelve per cent. water content and in this form is ready for packing.

The heating of the rice kernels with wet steam sterilizes the rice, stabilizes the fats and proteids and dextrinizes the starchy content of the rice kernels. The sterilizing of the rice destroys all animal life thereon. The stabilizing of the fats and proteids has the effect of preventing the rice from becoming rancid, and the dextrinizing of the starch content of the rice kernels renders the rice much less attractive to the weevil than untreated rice to the extent that the dextrinized rice is practically immune to attack by the weevil. The use of wet steam, instead of dry heat, avoids the cracking and breaking of the rice kernels, and when the so treated rice kernels have been dried to their original and normal moisture content, the kernels have the appearance of untreated or natural rice.

From the foregoing description it will be understood that the present invention is not the equivalent of cooking rice to render the same soft and palatable for eating purposes, but on the contrary is merely the preparation of rice for market, whereby the rice will be sterilized, immune from weevil and not liable to become rancid, and at the same time the rice kernels are preserved in their original form and bulk and have the general appearance of uncooked and untreated rice kernels as now commonly known to the public.

My invention prepares the rice in a manner which will cause it to keep in a prime state under all ordinary marketing conditions without in any way lessening the food value of the rice or changing it in form or bulk from its original condition. Therefore rice treated in accordance with my process may be put up in original packages by the miller and sold at any time of the year and in any part of the country, thus enabling the miller, the jobber and the retailer to systematize their respective businesses so far as the manufacture and sale of rice is concerned in a much more satisfactory manner than now exists. Furthermore, the waste, annoyance and loss due to the presence of animal organisms in rice today are entirely avoided by the use of my process, since the process acts as a preservative and rice so treated will keep in condition indefinitely.

I claim:

1. In the preparation of rice for market, subjecting hulled rice kernels for such a period of time to the action of steam having such a moisture content and such a temperature as will sterilize the kernels and dextrinize the starchy content thereof without cracking the kernels, and then drying the rice kernels to substantially the form, bulk and moisture content of untreated rice.

2. In the preparation of rice for market, subjecting hulled rice kernels with the germ and cuticle thereon for such a period of time to the action of steam having such a moisture content and such a temperature as will sterilize the kernels, dextrinize the starchy content thereof, and stabilize the fats and proteids without cracking the kernels, and then drying the rice kernels to substantially the form, bulk and moisture content of untreated rice.

3. In the preparation of rice for market, wetting hulled rice kernels, subjecting the wet hulled rice kernels for such a period of time to the action of steam having such a moisture content and such a temperature as will sterilize the kernels and dextrinize the starchy content thereof without cracking the kernels, and then drying the rice kernels to substantially the form, bulk and moisture content of untreated rice.

4. In the preparation of rice for market, wetting hulled rice kernels with the germ and cuticle thereon, subjecting said wet rice kernels to the action of steam having such a moisture content and such a temperature as will sterilize the rice kernels, dextrinize the starchy content thereof and stabilize the fats and proteids without cracking the kernels, and then drying the rice kernels to substantially the form, bulk and moisture content of untreated rice.

5. Uncooked rice kernels having substantially the form, bulk and moisture content of untreated rice, and which have been sterilized and dextrinized in hulled condition by the action of wet steam.

6. Uncooked rice kernels having substantially the form, bulk and moisture content of untreated rice, and which have been sterilized, dextrinized and stabilized in hulled condition by the action of wet steam.

MOSES M. BAUMGARTNER.

Witnesses:
 Wm. O. Belt,
 M. A. Kiddie.